Jan. 2, 1940.   H. K. RIDER   2,185,226
CONTROLLED DIFFERENTIAL MECHANISM FOR TYPEWRITERS AND OTHER MACHINES
Filed May 7, 1936   11 Sheets-Sheet 1
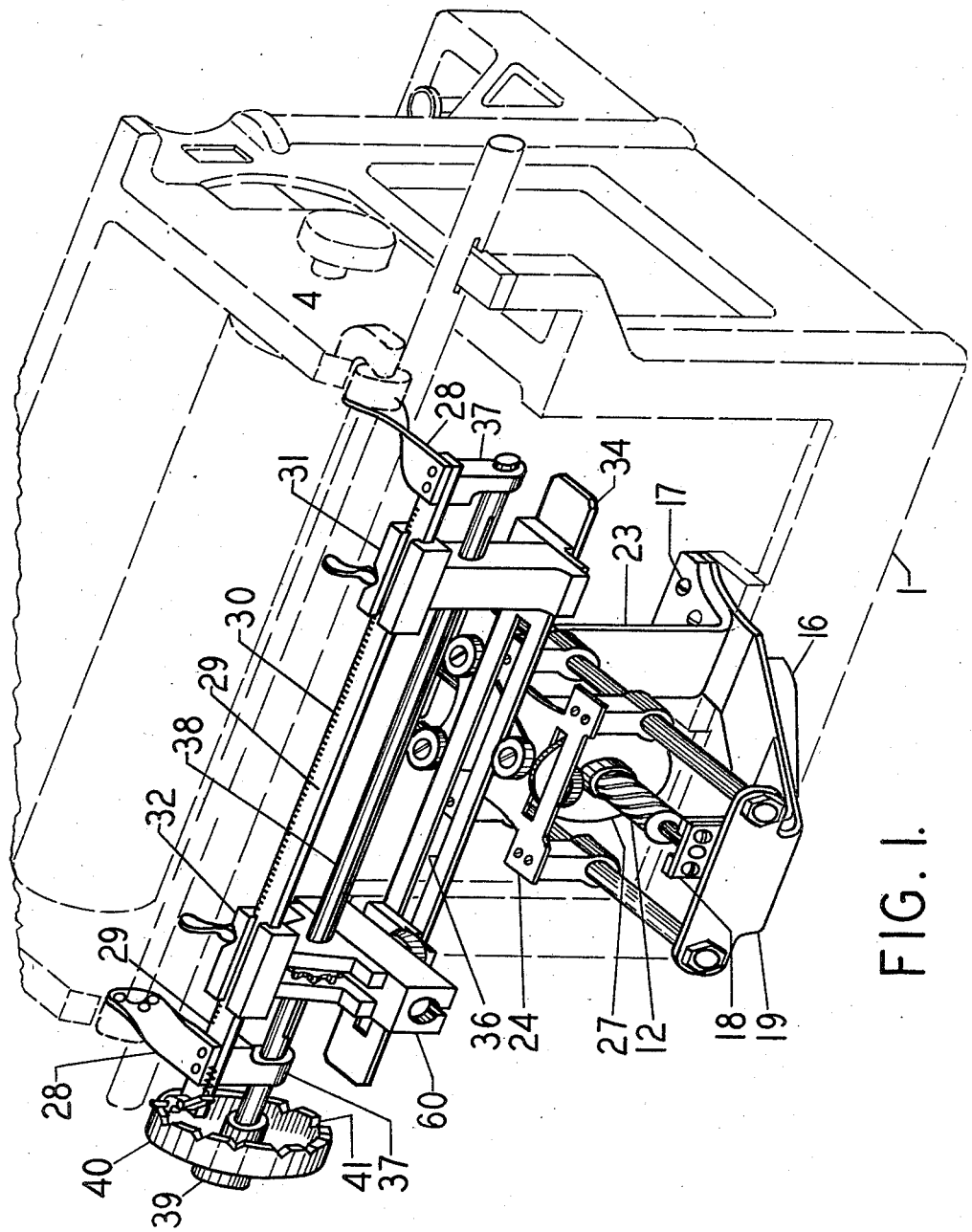
FIG. I.
INVENTOR
H. K. RIDER.
BY Roy A. Plant
ATTORNEY

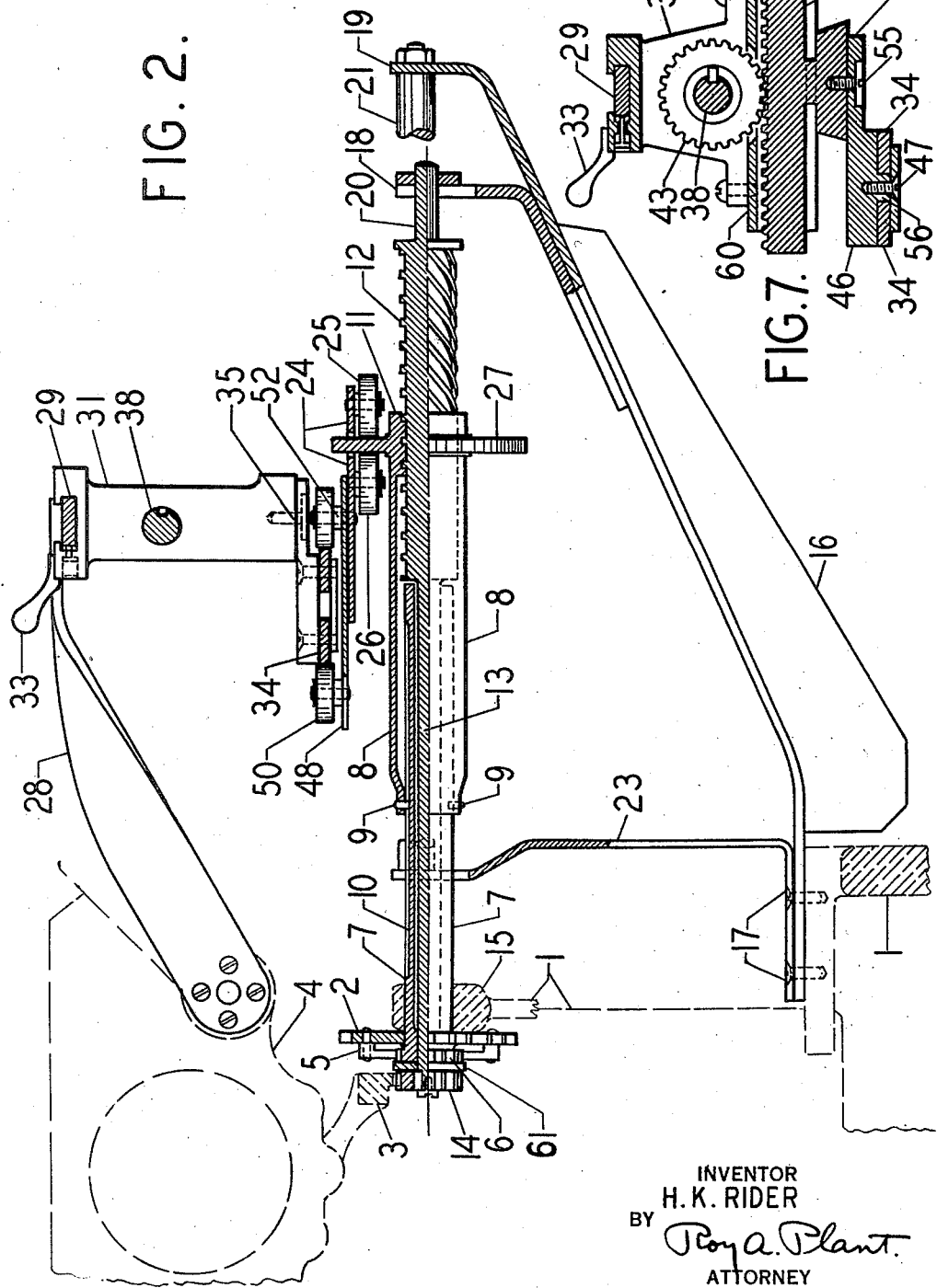

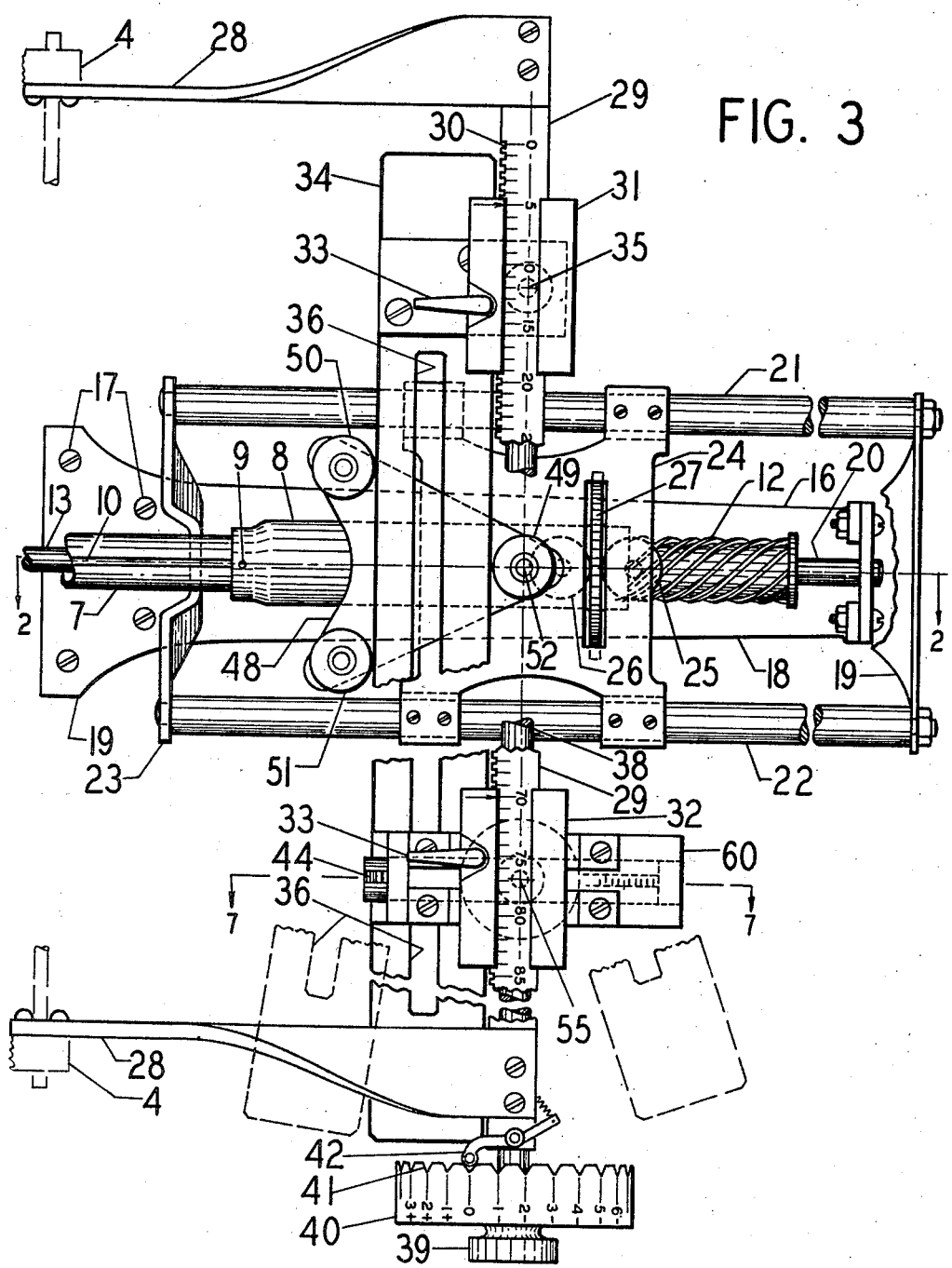

Jan. 2, 1940.  H. K. RIDER  2,185,226
CONTROLLED DIFFERENTIAL MECHANISM FOR TYPEWRITERS AND OTHER MACHINES
Filed May 7, 1936    11 Sheets-Sheet 4
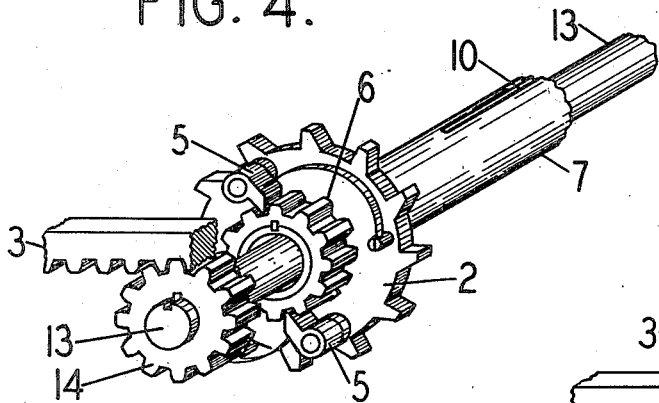
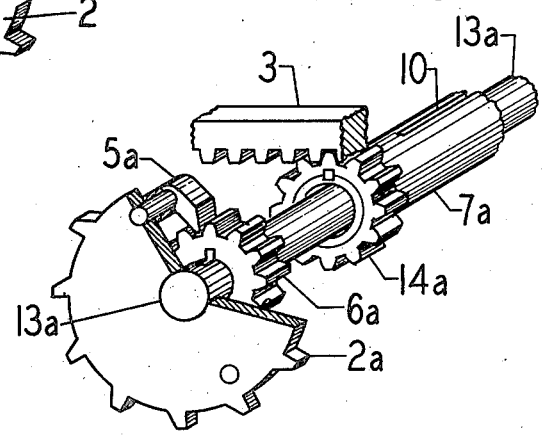
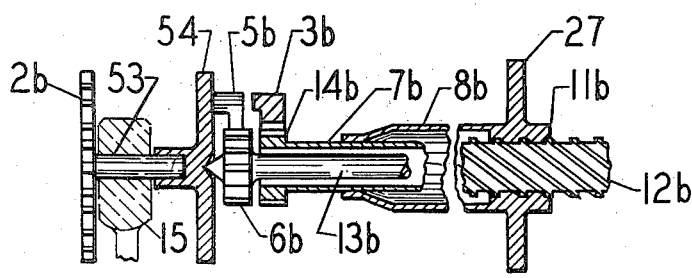
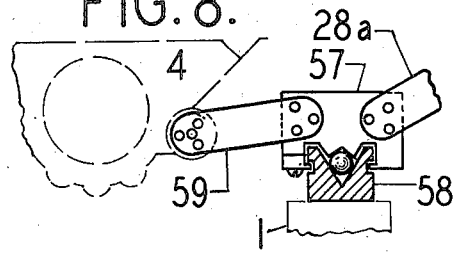
INVENTOR
H. K. RIDER.
BY Roy A. Plant
ATTORNEY

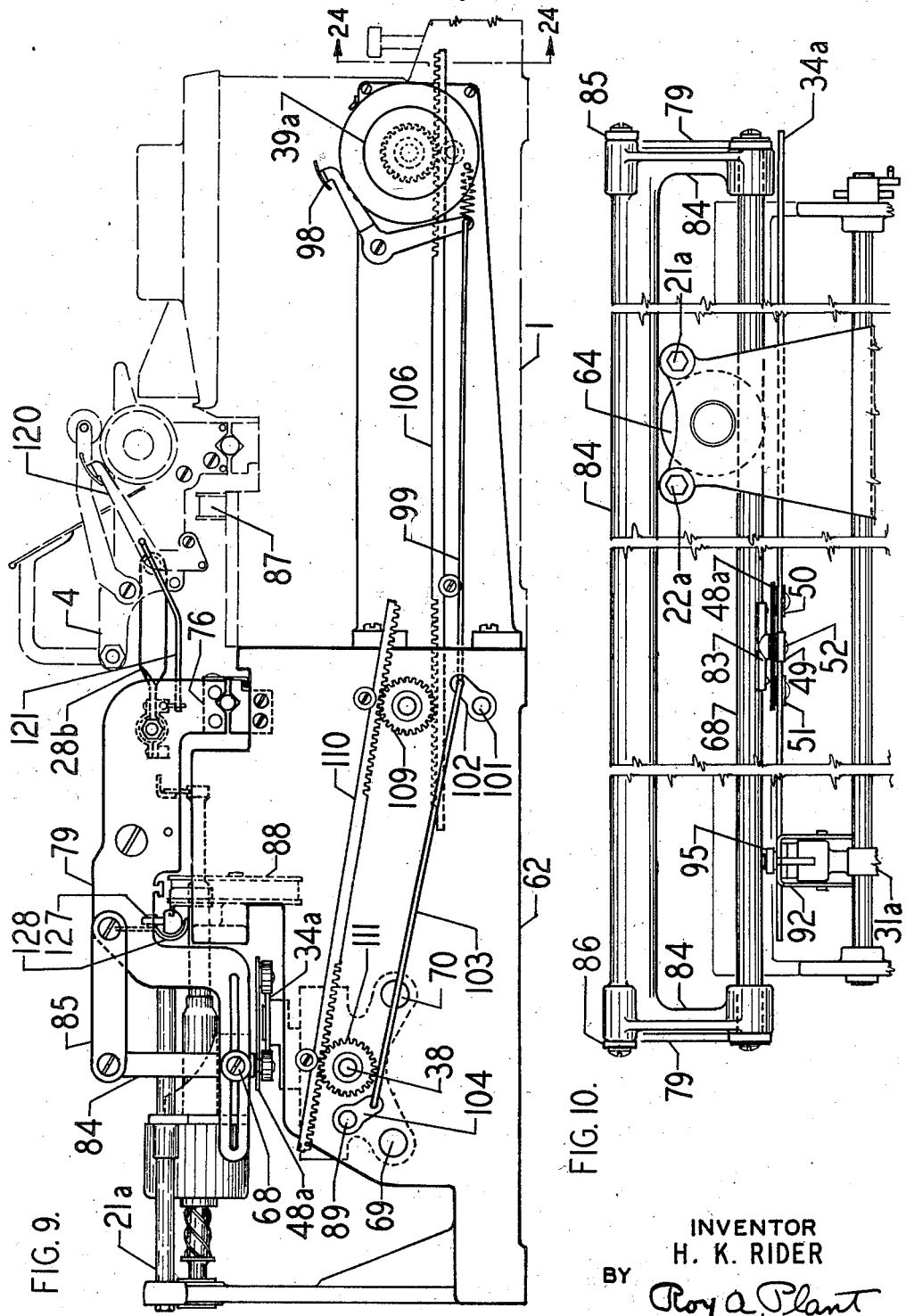

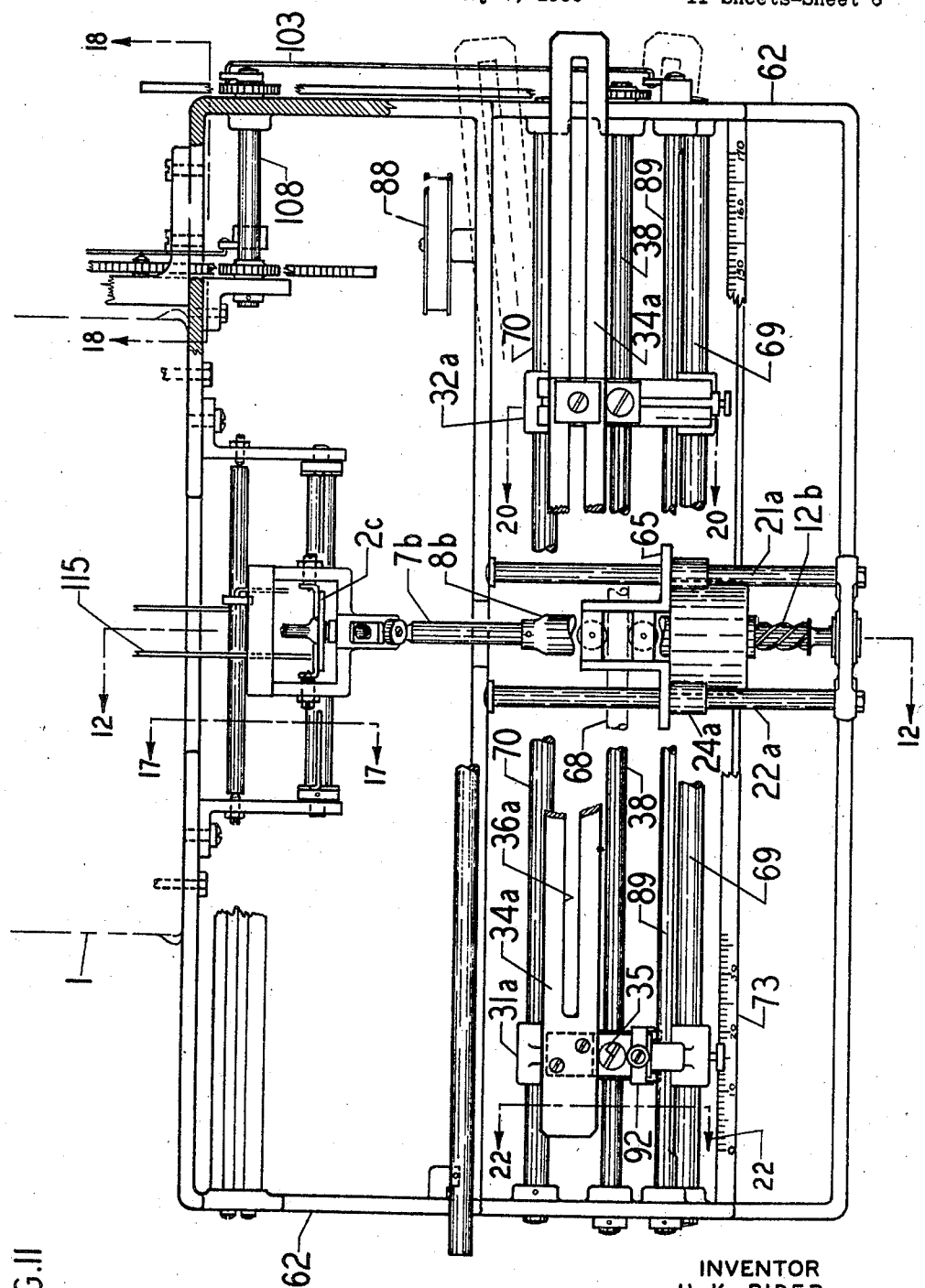

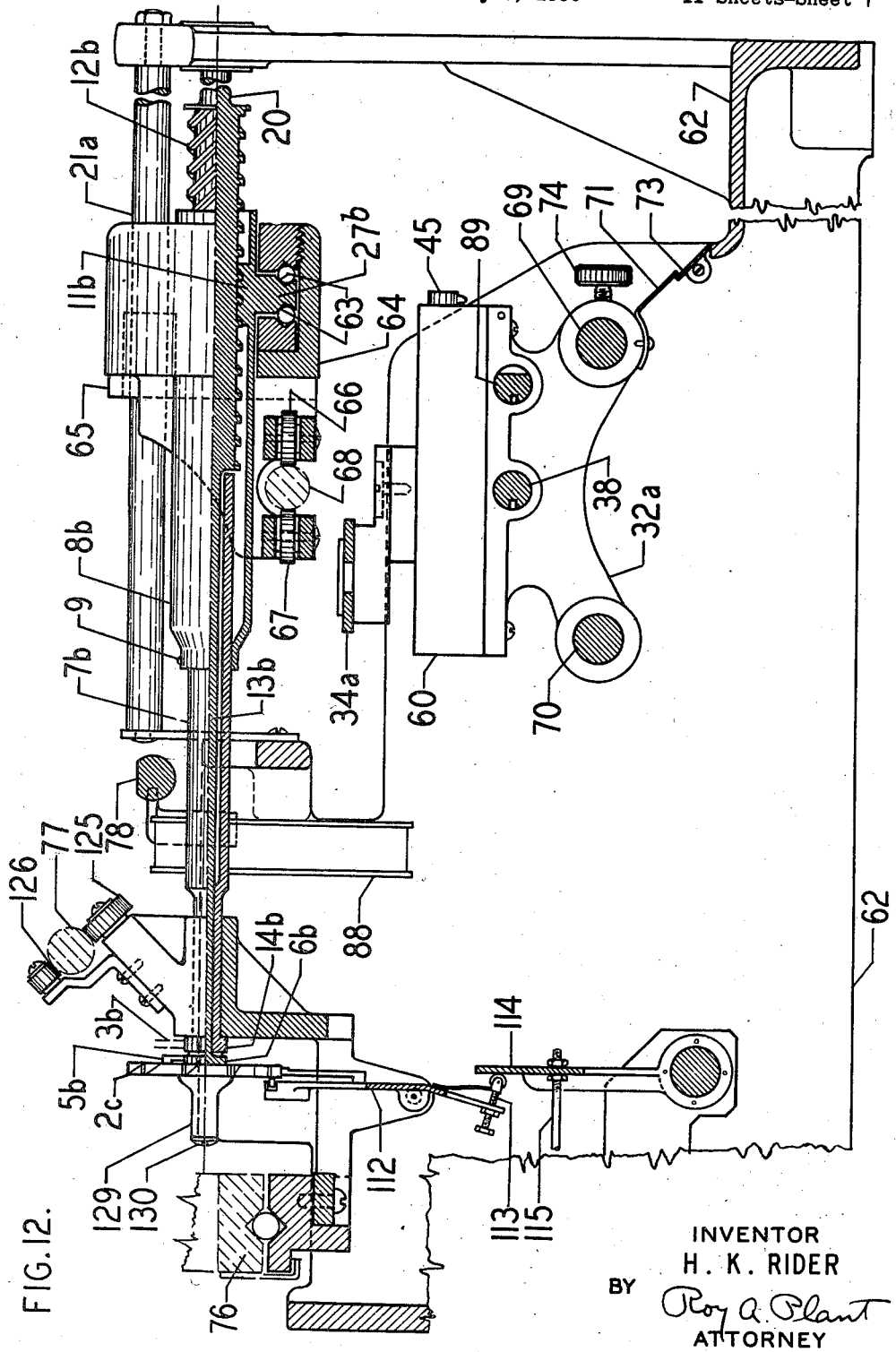

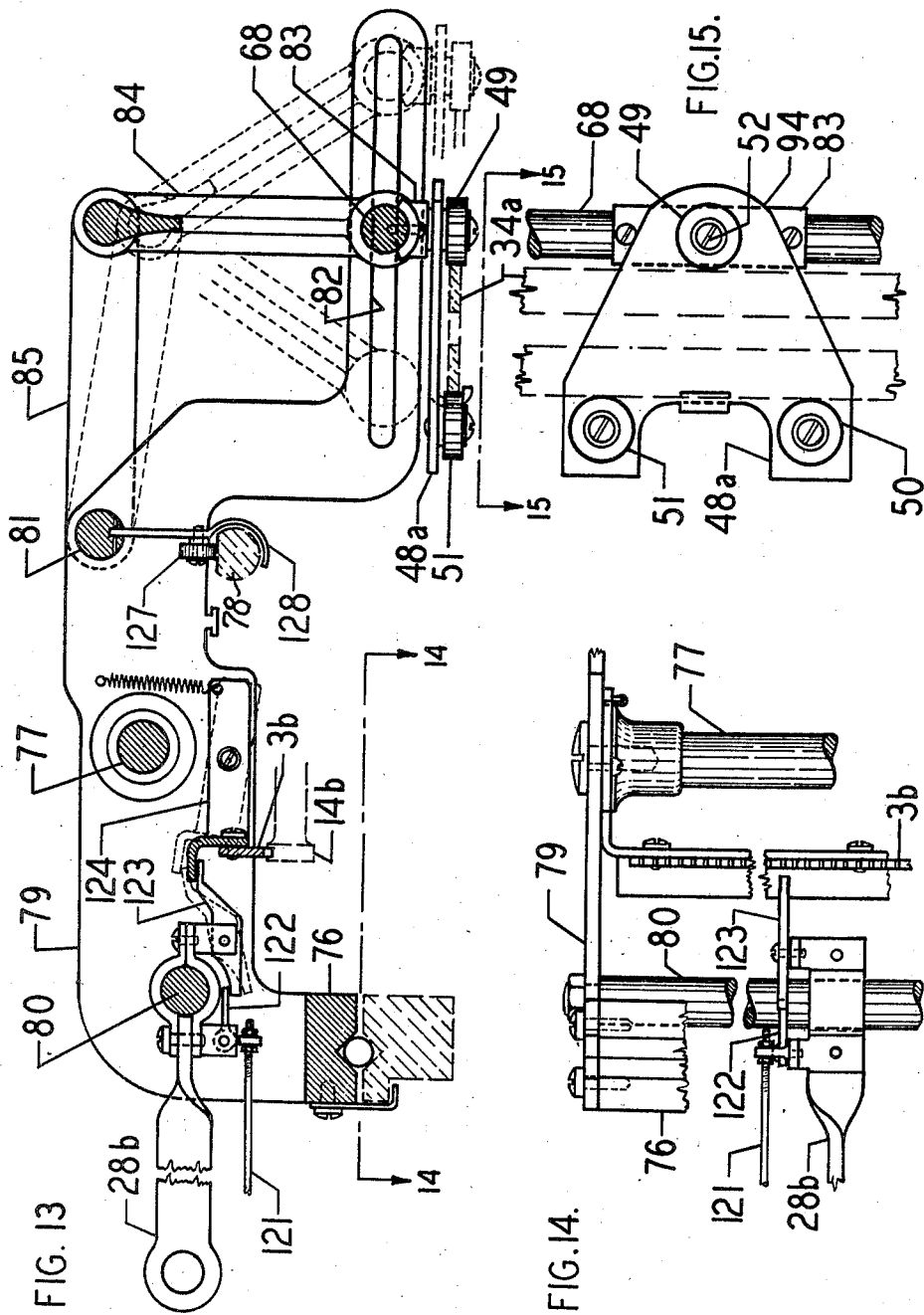

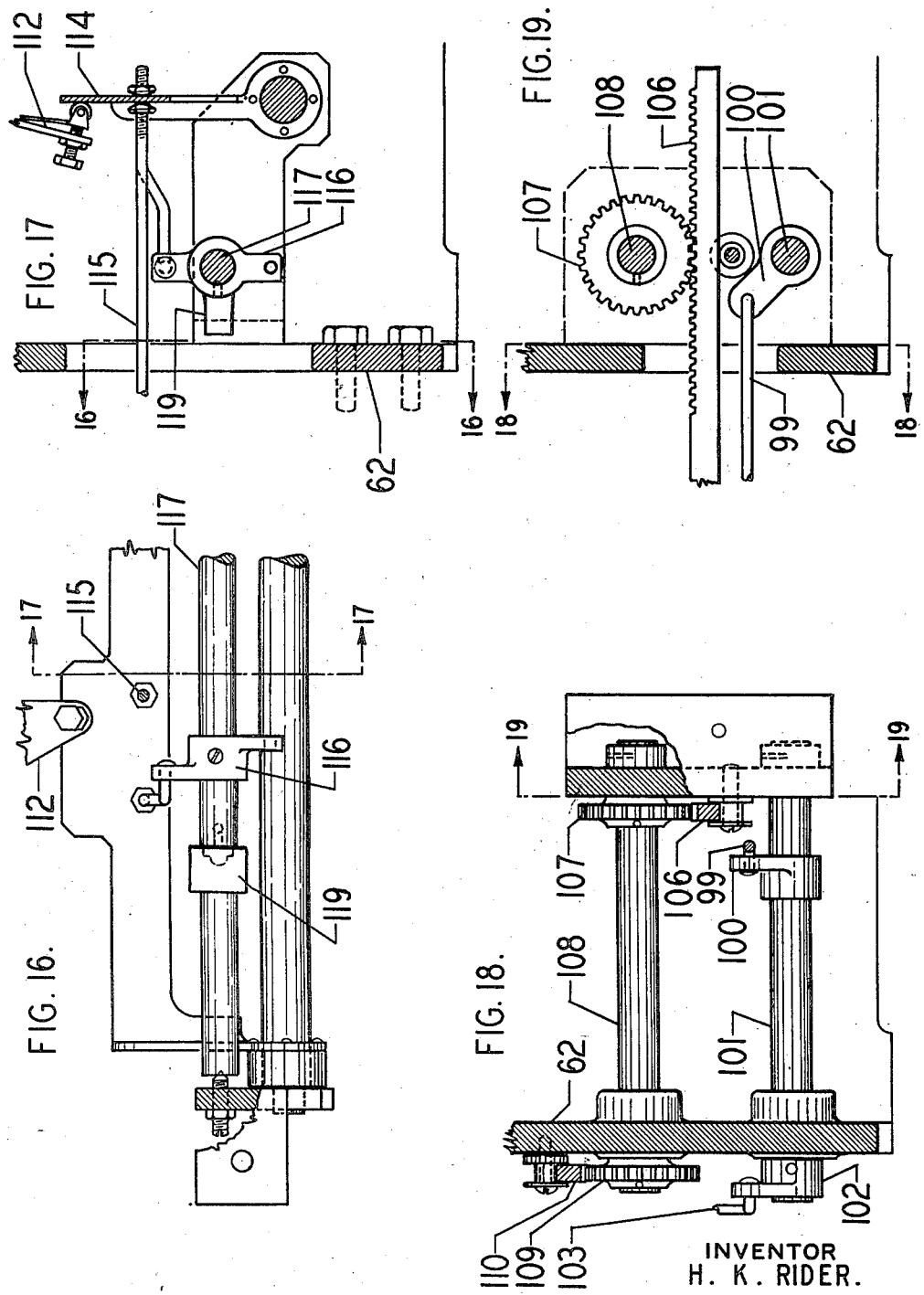

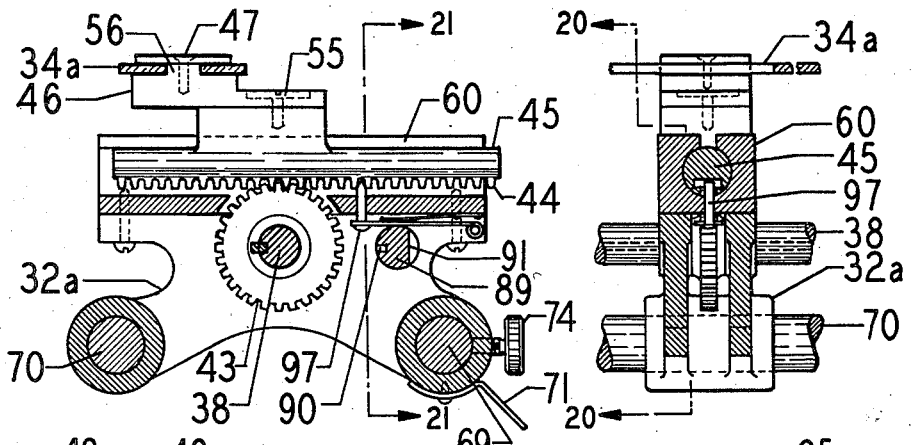

Jan. 2, 1940.   H. K. RIDER   2,185,226
CONTROLLED DIFFERENTIAL MECHANISM FOR TYPEWRITERS AND OTHER MACHINES
Filed May 7, 1936    11 Sheets-Sheet 11
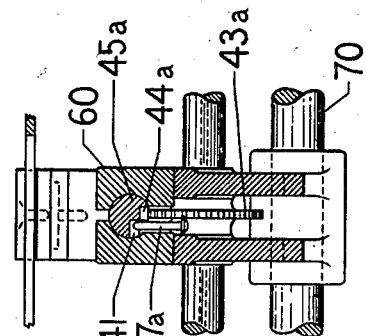
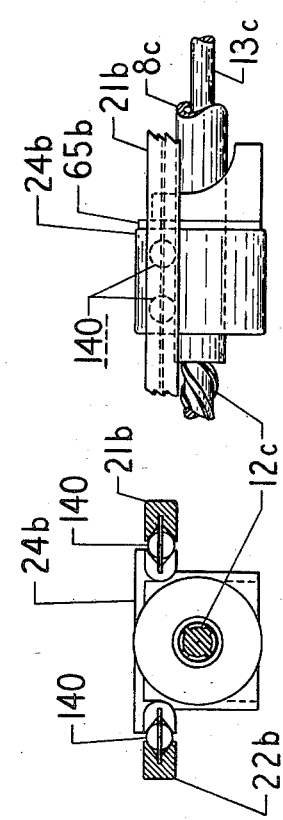
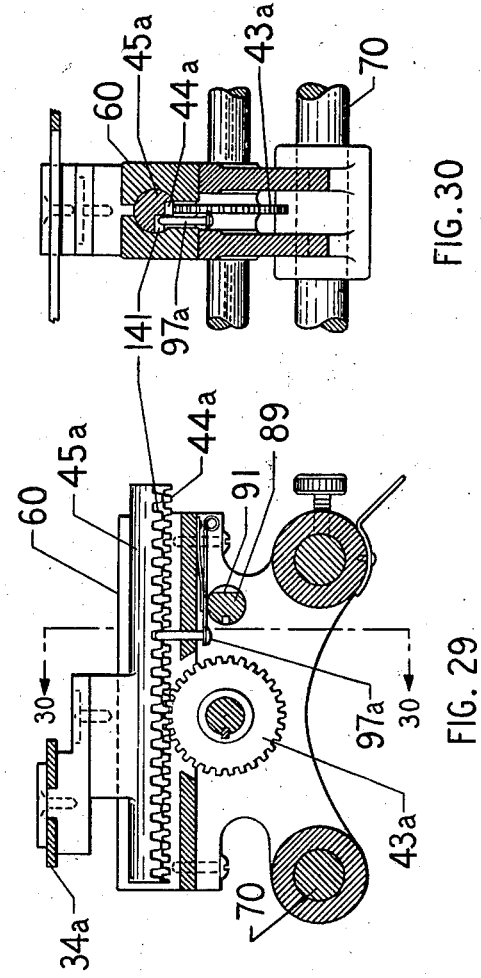
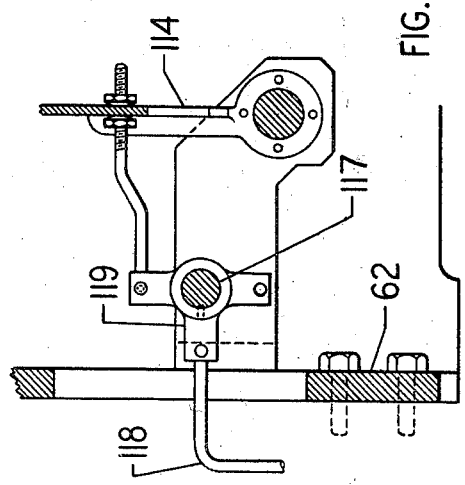
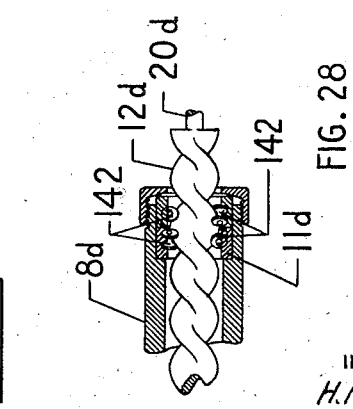
INVENTOR
H. K. Rider.
BY Roy A. Plant
ATTORNEY Patented Jan. 2, 1940

2,185,226

UNITED STATES PATENT OFFICE 2,185,226

CONTROLLED DIFFERENTIAL MECHANISM FOR TYPEWRITERS AND OTHER MACHINES

Harwood Kenneth Rider, Ann Arbor, Mich.

Application May 7, 1936, Serial No. 78,520

31 Claims. (Cl. 197—84)

The present invention relates generally to improvements in methods, and machines, which, before the application of my invention, have a movable carriage or the like, and a normally unadjustable movement control for same. In its specific phases the invention is applicable to typewriters, stencil cutters, graduating and calibrating machines of various types, and other key actuated devices, whereby same can be adjusted for variable graduation work, for instance, the justification of non-uniform length lines of typed matter to a uniform length by varying the spacing of the characters in the line.

The present patent application is a continuation-in-part of my copending patent application Serial No. 740,801 filed August 21, 1934.

It is well known that ordinary typewriters, aside from tabulation spacing, provide for regular releasing movements of their carriages, for each key actuation, which movements are standardized in respect to the particular type employed in the machine. Thus, it is obvious that on such a typewriter, lines of typed matter having a different number of characters per line, cannot be justified so as to be the same length.

In order to produce a printed sheet of maximum neatness, the left and right margins of the printed matter must be uniform, and obviously this cannot be attained on the ordinary typewriter. This difficulty, however, can be overcome if the number of characters in a given length of line can be increased or decreased as the case may be, since this will permit uniform right and left margins to be attained. Sheets of typed matter which have had each line justified to a standard length, are far superior in appearance to ordinary typing, and highly desirable for such uses as photographic reproduction, mimeographing, hectographing, and the like.

By the use of my improved mechanism, a wide variation in the extent of each feed movement of the carriage may be provided for without interfering with the normal standardized operation of the escapement, which may be either in the typewriter itself, or in an attachment containing the differential mechanism, and further, such mechanism is capable of easy application either by inbuilding or as a separate attachment to various makes of typewriters or other machines for producing typed matter where such machines utilize a movable carriage operated through an escapement mechanism.

For simplicity in setting forth the present invention the same will be described in terms of use in connection with a typewriter, although obviously the invention is not limited to such machines.

Among the objects of the present invention is the provision of a mechanism for use on a typewriter, wherein the typewriter, after mounting the mechanism thereon, may be adjusted to operate in the same manner as a conventional typewriter, or by suitable adjustment the number of characters in a given length of line may be increased or decreased. The increasing or decreasing of the number of characters per line will be referred to herein as line justification.

Another object of the invention resides in the use of a differential mechanism by means of which the spacing of the characters in the line may be varied in accordance with the particular setting of the space controller.

Another object of the invention is to provide means whereby one adjustment of the machine to add or subtract one character from a given length of line applies to all lengths of lines.

Another object of the invention is to provide uniform margins without readjusting the starting point of each line where the previous line has a different number of characters therein.

Another object is to provide for the operation of my improved mechanism through the use of a single rack bar firmly fixed either directly or indirectly to the carriage of the typewriter.

Another object is to provide a differential mechanism capable of uniform calibration of a given space or even a predetermined non-uniform calibration where a specially shaped angle bar or the like is used.

Another object is to provide a means for locking the angle bar in place so that it will stay in a fixed position until readjusted.

Another object is to provide a mechanism wherein once the angle bar is set, lost motion that would affect that setting is either entirely eliminated or at least reduced to a minimum.

Another object is to provide a mechanism whereby the angle bar is locked against readjustment unless the typewriter carriage is at, or approximately at, the starting point of a line of printed matter, or the like, to be justified.

Another object is to provide a means for releasing the carriage for free back and forth movement in conventional manner.

Another object is to provide a machine for calibrating or dividing space into a predetermined number of controlled size smaller spaces.

Another object is to provide a means for increasing the rigidity of the motion controlling parts of the machine and thus increase the accuracy of machines of this type.

Another object is to provide a calibrating mechanism adapted for use as a calibrator on many forms of different machines.

Another object is to provide a calibrating machine which is a complete unit adapted to operate with any typewriter.

Another object is to provide a means for connecting the escapement mechanism in the justifying machine, with the escapement actuating parts in the typewriter.

Another object is to provide a power means in connection with the justifying machine to reduce the load on the typewriter spring.

Another object is to provide different forms of my improved mechanism, some forms of which have the angle bar or cam member mounted on the carriage or movable portion of the machine, while others have it mounted on the frame or stationary portion of the machine.

A further object is to provide a mechanism which may be inbuilt or used as a removable attachment for machines to be used for variable graduation or line justification work.

Further objects and advantages of the invention will appear as the description proceeds.

To the accomplishment of the foregoing and related ends, the invention, then, consists of the steps and means hereinafter fully described and particularly pointed out in the claims, the annexed drawings and the following description setting forth in detail certain means and modes of carrying out the invention, such disclosed means and modes illustrating, however, but several of various ways in which the principle of the invention may be used.

In said annexed drawings:

Fig. 1 is an isometric view showing my improved line justifying mechanism mounted on a typewriter.

Fig. 2 is a partially sectioned side view of my improved mechanism taken at 2—2 of Fig. 3.

Fig. 3 is a plan view of the mechanism shown in Fig. 2.

Fig. 4 is an isometric view of the inner end of the attachment shown in Fig. 2, showing in spread-out manner the relationship of the parts adjacent to the rack bar of the typewriter.

Fig. 5 is a view similar to Fig. 4 but with the parts reversed.

Fig. 6 is a partially sectioned view of the differential mechanism arranged for operation with the rack bar fixed to the carriage but hung back of the typewriter frame.

Fig. 7 is a sectional view at 7—7 of Fig. 3.

Fig. 8 is a diagrammatic view showing the attachment of an auxiliary carriage to the typewriter.

Fig. 9 is a side assembly view of a modification of my improved invention wherein the mechanism is constructed as a unit to which a typewriter may be attached.

Fig. 10 is a partial rear view of the mechanism shown in Fig. 9.

Fig. 11 is a partially sectioned plan view of the lower portion of the mechanism shown in Fig. 9, but with the carriage removed.

Fig. 12 is a partially sectioned view of the lower portion of the mechanism shown in Fig. 9 as taken along line 12—12 of Fig. 11.

Fig. 13 is a vertical section of the justifier carriage.

Fig. 14 is a bottom view of a part of the left end of the carriage, taken along the line 14—14 of Fig. 13.

Fig. 15 is a bottom view of part of the justifier carriage showing the angle bar saddle, as viewed along line 15—15 of Fig. 13.

Fig. 16 is a front view of the escapement actuator mechanism, as shown along line 16—16 of Fig. 17.

Fig. 17 is an end section of the actuator mechanism taken along the line 17—17 of Fig. 16 and line 17—17 of Fig. 11.

Fig. 18 is a front view of the jack shafts for the angle bar control and lock mechanism as taken along line 18—18 of Fig. 11 and 18—18 of Fig. 19.

Fig. 19 is an end section of Fig. 18 taken along line 19—19.

Fig. 20 is a vertical section through the adjustable angle bar support, taken along line 20—20 of Fig. 21.

Fig. 21 is a rear elevation section of the adjustable angle bar support, as taken along line 21—21 of Fig. 20.

Fig. 22 is an end view of the fixed pivot angle bar support, as viewed along line 22—22 of Fig. 11.

Fig. 23 is a rear elevation of the fixed pivot angle bar support, with lock shaft or rod 89 omitted.

Fig. 24 is a front view of the graduated disc, with angle bar and lock control, as viewed along line 24—24 of Fig. 9.

Fig. 25 is a view of a modified form of the mechanism shown in Fig. 17.

Fig. 26 is a partially sectioned end view of the spiral mechanism mounted on V tracks with ball bearing followers.

Fig. 27 is a side view of the mechanism shown in Fig. 26.

Fig. 28 is a partially sectional side view of the spiral mechanism when in the form of a twisted bar with roller followers.

Fig. 29 is a view of a modified form of the adjustable angle bar support mechanism shown in Fig. 20.

Fig. 30 is a rear elevation section view of the adjustable angle bar support mechanism, as taken along the line 30—30 of Fig. 29.

My present invention when applied to a typewriter as shown in Fig. 1 operates in the following manner: The differential mechanism is attached to frame 1 of the typewriter, at the back thereof, so that the spring tension applied to carriage 4 in well known manner, is transmitted to rack 3 (Fig. 2) and thence through the controlled differential mechanism to the escapement wheel 2, the rotative movement of which is permitted step by step through the actuation of the typewriter keys. Thus due to the justification through adjustment of the controlled differential assembly, when a given line is typed it will have a predetermined length, though it may have slightly more or less characters than is standard for the particular machine. The carriage is then retuned to its initial position and the cylinder, with typed sheet, rotated to take the next line of typing which in turn is justified to the predetermined width of the typed matter. This procedure is followed until the typing is completed or the sheet filled, it being noted that under these conditions the typed matter will present uniform margins on both sides of the sheet, except for indentation at the beginning of paragraphs, if such is desired.

Referring more particularly to the drawings, carriage 4 is mounted in the conventional manner for endwise but not vertical movement; however, such machine may have a sub-carriage capable of vertical movement, and will require no further description since such is clearly shown in the typewriter art. The escapement wheel 2 which is present in all typewriters may be rearranged to a new location if desired, but I normally prefer to leave it located at the point where the typewriter manufacturer placed it. Referring to Figs. 2 and 4, the conventional escapement wheel 2 carries escapement wheel pinion pawls 5 which engage with the escapement wheel pinion 6 as is well known to the art. The pinion 6 is mounted on hollow shaft 7 which has mounted thereon for rotation therewith a tubular sleeve 8 arranged for endwise motion relative thereto by means of keys 9 mounted to slide in keyways 10 lengthwise of the outer surface of hollow shaft 7. I do not wish, however, to be limited to the use of such keyways and keys as obviously there are many other combinations such as feather keying, square or hexagon shaft and sleeve, et cetera, which will accomplish the same end in equivalent manner. At the opposite end of sleeve 8 is provided a spiral nut 11 meshing with a spiral thread 12 on shaft 13, the opposite end of which carries rack pinion 14 which meshes with rack 3.

In the ordinary typewriter the escapement wheel pinion has two functions, first it meshes with rack 3 on carriage 4 from which power is transmitted to it due to the tension of the conventional typewriter spring attached to the carriage, and second it acts as a ratchet for the escapement wheel pinion pawls 5. According to my invention, I split the escapement wheel pinion into two parts (Fig. 2) 14 and 6 with or without a space washer 61 therebetween. Pinion 14 then becomes the rack pinion, and pinion 6 the escapement wheel pinion which acts as a ratchet for the escapement wheel pinion pawls 5. Pinions 14 and 6 are mounted on concentric shafts 13 and 7 which are connected together for relative movement through spiral nut 11 and spiral thread 12 for operation as hereinafter set forth in detail.

The differential mechanism starting with rack pinion 14 and ending with escapement wheel 2 is supported at the rack pinion end by means of a bearing 15 in typewriter frame 1. The opposite end of the differential mechanism is supported by means of a bracket arm 16 attached to the frame of the typewriter by suitable means such as screws 17. The outer end of bracket arm 16 has two vertically extended arms 18 and 19. The inner arm 18 acts as a bearing for a projection 20 on the free or outer end of shaft 13. Outer arm 19 acts as the outer support for rods 21 anad 22 (Fig. 3). The inner ends of said rods 21 and 22 are supported adjacent to the back of the typewriter by means of a vertical supporting arm 23 mounted on bracket 16. Attached to said rods 21 and 22 in endwise slidable relation therewith, is saddle 24. On the under-face of said saddle 24 are mounted two rollers 25 and 26, said rollers 25 and 26 being mounted above spiral nut 11 of the differential mechanism and on opposite sides of disc 27 which projects vertically from the outer circumference of said spiral nut 11. It is thus obvious that if saddle 24 is slid forward or back on rods 21 and 22 then rollers 25 and 26 by contact with disc 27 will move spiral nut 11 forward or back on the spiral thread 12 and if, for instance, the keys of the typewriter are not actuated and escapement wheel 2 thus held fixed in position, the movement of spiral nut 11 over spiral thread 12 of shaft 13 will result in the shaft rotating and since rack pinion 14 is mounted in fixed position on the inner end of the same then it will move rack 3 and carriage 4 in an endwise direction. It is thus clear that in order to uniformly compensate a line of typed matter to a standard length, it is only necessary to set the justifying mechanism so that spiral nut 11 will move uniformly in or out over spiral thread 12, during the typing of the line, to uniformly increase or decrease the spacing between typed characters, as may be needed to cause the line of typed matter to conform to the predetermined length desired.

The use of rods 21 and 22 to support saddle 24 in slidable relation thereon, illustrates one convenient method of accomplishing this end, but I wish it to be understood that such showing is diagrammatic and that other equivalent mechanism, such as the use of V tracks 21b and 22b with ball bearing followers 140 (Figs. 26 and 27) is intended to be covered thereby.

It is to be noted that the differential mechanism just described is mounted on the frame of the typewriter, while on the other hand the space controlling portion of the justifying mechanism which causes spiral nut 11 to move in or out over spiral thread 12, is attached to the frame of the endwise movable carriage 4 by means of brackets 28.

The mechanism through which adjustments are made to vary the spacing between characters of the typed sheet is mounted on carriage 4 by means of brackets 28, the outer ends of which are joined by means of a graduated bar 29, having teeth 30 on the edge thereof. Movable brackets 31 and 32 are suspended from said graduated bar 29. Brackets 31 and 32 are provided with a conventional locking mechanism 33 adapted to engage with teeth 30 on graduated bar 29 thus permitting brackets 31 and 32 to be moved endwise along graduated bar 29 and be locked in place at any point by means of locking mechanism 33 meshing with teeth 30. Attached to the lower extremities of brackets 31 and 32 is angle bar 34, said angle bar 34 being pivoted on bracket 31 by means of pivot 35. Bracket 32 (Figs. 3 and 7) is connected to angle bar 34 through slot 36 in manner providing for movement of angle bar 34 forward and back at that end as desired. Mounted in brackets 37 (Fig. 1), suspended from brackets 28, is keywayed shaft 38 which also passes through brackets 31 and 32. Shaft 38 is suitably held against endwise movement by conventional means not shown. The end of shaft 38 is provided with a knob 39 and graduated dial 40 having a suitably notched innerface 41, adapted to be engaged by a spring actuated dog or detent 42 which also serves as a pointer to indicate the number of character spaces to be added or subtracted from the standard spaced line, so that it will be justified to the prescribed length. Shaft 38 is keywayed and provided with a slidable key engaging in bracket 32 (Fig. 7) with gear 43 which meshes with rack 44 on bar 45. At the lower edge of bar 45 is attached an arm 46 movably attached through pivot 55 to slotted angle bar 34. Movable arm 46 at the angle bar end has firmly joined thereto a rectangular part 56 adapted to snugly yet slidably fit slot 36 in angle bar 34. Arm 46 and angle bar 34 are held together in slidable relation by means of connector 47. The assembly of arm 46 with angle bar 34 in this manner causes arm 46 to always stand perpendicular to angle bar 34 which permits line justification with a uniform right margin for any length of line without recalibration of graduated dial 40 when using my present improved mechanism. Thus, it will be seen that by turning knob 39 shaft 38 will be rotated and it in turn will rotate gear 43 which through rack 44 will move bar 45 and the end of slotted angle bar 34 forward or back in accordance with the direction of rotation of knob 39. In such movement the slotted angle bar 34, as shown in Fig. 3, will swing around pivot 35 on the underside of bracket 31. While I have shown and described the invention in terms of using a slotted angle bar, I do not wish to be limited to that particular construction since obviously a solid angle bar, or other shaped bar may be used with equal success by minor changes to arm 46.

The adjustment mechanism just described is operatively connected to the differential mechanism through plate 48 (Fig. 3) which carries rollers 49, 50, and 51 in contact with the front and back faces of angle bar 34. Of these rollers, 49 is the most important as the tension of the machine with spiral 12 as shown in Fig. 1, holds it in contact with angle bar 34 throughout the movement of carriage 4 while the line is being typed, thus making it an important element in the justifying mechanism. The principal function of rollers 50 and 51, on the other hand, is to aid in quick return of the carriage. Plate 48 is pivotally mounted on saddle 24 by means of a pivot 52, thus joining the differential mechanism with the space controlling mechanism in manner such that when the angle bar 34 is turned forward or back at the graduated disc end by means of knob 39, to vary the spacing between typed characters a specified amount, then as the carriage 4 is moved endwise plate 48 will move forward and back carrying saddle 24 with it, which in turn will cause spiral nut 11 to move forward and back over spiral thread 12, thus varying the travel of carriage 4 from the standard movement per character to that required for the purpose of line justification.

In some cases, due to the particular construction of the typewriter to be used, it may be desirable to reverse the parts of the differential mechanism. This may be accomplished, for instance, as is shown in Fig. 5, where the rack pinion 14a instead of being mounted on the inner shaft is mounted on hollow shaft 7a which carries the conventional keyway 10 the same as shown in Fig. 4. In this case, however, escapement wheel 2a as well as the escapement wheel pinion 6a are mounted on shaft 13a where they function in like manner to the combination shown in Fig. 4. The mechanism shown in Fig. 6 is another variation of the reversed mechanism of Fig. 5. In connection with these reversed mechanisms, it is to be noted that they will put the pressure on the opposite side of angle bar 34 so that rollers 50 and 51 will become active and roller 49 will become an idler. The angle that the angle bar 34 takes from its zero position will also be reversed as described hereafter in connection with use of a right hand spiral.

In some places it may be desirable to place the rack 3b operating the carriage 4, back of the frame of the machine, which will of course, require a disconnection or a removal of the normal rack 3 from the machine. Such a combination is shown in Fig. 6 where the escapement wheel 2b is left at its usual position inside the machine, but is mounted on a stub shaft 53 on the outside end of which is mounted a disc 54 carrying the escapement wheel pinion pawls 5b which engage with escapement wheel pinion 6b mounted on shaft 13b which in turn carries spiral thread 12b meshing with spiral nut 11b attached to sleeve 8b arranged for endwise movement over hollow shaft 7b which carries rack pinion 14b meshing with rack 3b.

In some cases it may be desirable to use, instead of the left hand spiral thread shown at 11 and 12 of Fig. 2, a right hand spiral thread as shown at 11b and 12b in Fig. 6. The reversing of the spiral to right hand will put the pressure against angle bar 34 on the opposite side thereof, so that rollers 50 and 51 will become active and roller 49 will be the idler. The reversing of the spiral will also reverse the angle that angle bar 34 sets away from its zero position, for the same kind of work, for instance, expanding or contracting the character spacing as the case may be.

While most typewriters are equipped for typing while the carriage moves from right to left, the typewriters for Hebrew characters are arranged for typing in the opposite direction. My present improvement is adapted to operate with that type of machine by changing end for end the space controlling mechanism supported on brackets 28. I have found that a spiral cut on a 45° angle as shown in Fig. 3 works satisfactorily; however, I do not wish to be limited to that specific angle since obviously other angles within reasonable limits can be satisfactorily used. When angle bar 34 is positioned as shown in heavy lines in Fig. 3 (zero position) the operation of the typewriter will result in the normal spacing of the typed characters; for instance, in the case of pica type, there will normally be ten characters to the inch. However, if the angle bar 34 is thrown forward or back, the movement of the typewriter carriage 4 will result respectively in increased or decreased spacing between characters thus permitting justification of lines of typed matter to a constant length. With a five inch line, for instance, it is an easy matter to stretch a line out six characters, or crowd it in two characters to make the standard five inch line. This will take care of substantially all the justification of lines that is necessary, when it is considered that long words can be broken up into syllables and hyphenated. However, two and six are not the limits of justification on the machine, although it must be recognized that as the characters are crowded closer and closer together, there is a limit to which it can be carried before the characters start piling up and making a continuous black line which is difficult to read. The increasing of the spacing, likewise, can be carried to a point where the spacing is greater than that which appears normally pleasing to the eye. The increasing or decreasing of the spacing between characters should accordingly be kept within such limits as are best suited for the particular job at hand, and normally that is the spacing which appears pleasing to the eye and easy to read.

While I have described my invention in terms of the spiral thread 11 and 12 shown in the drawings, I do not wish to be limited to that exact construction, as it is obvious, that there are many other equivalent ways of accomplishing the same end, such as, for instance, a twisted bar 12d with roller followers 141 (Fig. 28), or the like.

While graduated bar 29 may be provided with stops for the carriage, I normally prefer to use the regular stops on the typewriter to stop the carriage 4. These stops are set at the desired points for example at twenty and seventy in case of the normal 5 inch pica line, brackets 31 and 32 being set to synchronize with such setting of the carriage stops. Carriage 4 is then moved to the starting point of the line, where pivot 35 of angle bar 34 will be located directly over pivot 52, which connects plate 48 to saddle 24. In this position angle bar 34 may be turned forward or back by means of knob 39 without producing any movement of spiral nut 11 over spiral thread 12. Therefore, the left hand margin of the justified typed matter must of necessity be uniform. The right hand margin is also uniform, since in justifying a line the number of characters therein are counted and the machine set so that the spacing of the characters will just cause them to fill the specified length of line.

Taking a given line, for instance five inches long, which will normally contain fifty characters in case of a pica machine, the first step is to calibrate graduated dial 40 so that the space between notches 41 will be such that each movement of one notch will mean an increase or decrease, as the case may be, of one character in the typed line while maintaining its length uniform. Having thus calibrated graduated dial 40, these graduations apply for all lengths of lines, bearing in mind that the stops and justifying mechanism are reset for each new length of line to be justified to. The turning of graduated dial 40 one character, for instance, will correct the typed line one character whether that line is five inches long or any other length, for instance, ten inches. The reason that the calibration is constant is that the rotation of calibrated graduated dial 40 moves rack 44 and bar 45 a predetermined distance per graduation regardless of the length of line being typed, and this movement is transmitted to angle bar 34 mounted on pivots 35 and 55 both of which are the same distance from the edge of angle bar 34. A line joining the centers of pivots 35 and 55 is always parallel to the edge of angle bar 34, regardless of length of line being typed, and accordingly both will set at all times at the same angle with the zero position. The center of pivot 52 is so located that it follows the line joining the centers of pivots 35 and 55 during the movement of the carriage. With a long line, brackets 31 and 32 will be spread far apart and the angle that slotted angle bar 34 will make with its zero position for a change of one character per line will be small compared with the angle it will make when the line being typed is short. This change of angle with the change of length of line automatically compensates so that the graduation remains constant for all lengths of lines.

If desired the typewriter may be provided with an auxiliary carriage 57 (Fig. 8) supported in conventional manner on guide track 58 mounted on frame 1 of the typewriter or an extension thereof. Auxiliary carriage 57 may be connected with carriage 4 in any suitable manner, so as to operate in unison therewith, arms 59 being shown to diagrammatically illustrate one means of accomplishing this end. Brackets 28a function to join the control portion of the justifying mechanism to auxiliary carriage 57.

The drawings show in clear manner how my improved line justifying mechanism may be built into the conventional typewriter. In some cases, however, it may be desirable to have the improved mechanism in the form of an attachment rather than inbuilt into the machine. This is particularly true where it is desired to use one mechanism on various machines, which, for instance, may be equipped to type different languages such as Greek, Old Style German, or the like. To use my improved line justifying mechanism as an attachment, the typewriter to which it is to be attached must be slightly altered, and this can be done in many ways. One convenient manner for accomplishing this end is to leave the conventional escapement mechanism in the typewriter in accordance with its standard construction. The escapement wheel in such case, however, as shown in Fig. 6 may be mounted on a stub shaft 53 carrying on its outer-end a disc 54 having mounted thereon escapement wheel pinion pawls 5b adapted to engage with pinion 6b on the differential mechanism. With this type of set-up, it is obvious that my improved justifying mechanism may be easily removed from the typewriter by merely removing screws 17 and disconnecting brackets 28, the reverse procedure being followed in remounting the justifying mechanism on another so prepared typewriter. Such typewriter, of course, will carry the conventional rack 3 in operative relation with the standard escapement mechanism within the machine. Such rack 3 functions to operate the carriage 4 when my improved line justifying mechanism is disconnected from the machine. However, with the line justifying mechanism attached to the machine, rack 3 is disengaged and rack 3b then functions through its connection to carriage 4 to transmit the tension from carriage 4 through the differential mechanism to the escapement wheel 2b, thus permitting the mechanism to operate as a line justifier as heretofore described.

In accordance with my present invention the procedure of making a sheet of typed matter having lines compensated to a standard length is accomplished as follows: The material to be typed is first typed on a typewriter according to the standard character spacing, the sheet preferably being ruled first to show the desired margins and the outside limits at the right margin within which the line must fall if it is to be justified. Having the sheet to be copied thus prepared, it is only necessary to turn knob 39 to set graduated dial 40 so that pointer 42 indicates the proper correction for the first line to be typed. This will throw slotted angle bar 34 in or out at the dial end, as the case may be, so that as typewriter carriage 4 moves cross-wise during the typing, it will automatically have the spacing between characters properly condensed or extended. Then when the line is typed on the sheet placed in the machine it will begin and end at the proper margin lines, if the line is not indented, and even in the latter case the right hand margin will be uniform. The second line is handled in the same manner, and so on throughout the page. This will produce a sheet of justified type matter having uniform left and right margins with indentations along the left margin if indented paragraphs are used.

In Figs. 9 to 30 inclusive, a modified form of my improved mechanism is shown. This form of mechanism is constructed as a complete unit to which a typewriter or the like may be attached. The angle bar 34a instead of being fastened to the carriage, as has been heretofore described, is mounted in the fixed portion of the unit. The typewriter carriage has an auxiliary carriage attached thereto which has a pivoted member connected to the angle bar through a suitable joiner mechanism and adapted to move in accordance with the setting of such angle bar. The movement of the pivoted member at the same time moves the nut 11b over spiral thread 12b so as to accomplish the desired variation in movement of the carriage from standard escapement spacing, as has been hereinbefore set forth in detail. The knob and graduated dial used for varying the spacing of letters is mounted at the side of the typewriter keyboard, instead of on the carriage as was shown in Fig. 3, though many other equivalent forms of construction may be employed, as well as reversal of sides on which the graduated dial is placed.

The fixed or differential mechanism containing portion of the unit is constructed as follows: Referring to Fig. 12, a frame 62 is used to support the various parts of the unit. Mounted on this frame are two parallel guide rods, or the like, 21a and 22a (see also Fig. 11) on which the spiral nut 11b is slidably mounted by means of saddle 24a. Spiral thread member 12b is mounted in the manner hereinbefore set forth in detail, and in engagement with spiral nut 11b. Spiral nut 11b is provided on its outer surface with a disc-like member 27b, having ball race grooves 63 cut on its side faces near the outer circumference thereof. An outer shell or ball bearing retainer 64 may be used to impart endwise motion through ball bearings to disc 27b in comparable manner to rollers 25 and 26 shown in Fig. 3. The ball bearing retainer 64 is mounted so as to move as an integral part of the spiral nut assembly which carries member 65. The member 65, attached to saddle 24a, has as a part thereof rollers 66 and 67, which contact opposite sides of the carriage-suspended angle bar differential transfer rod 68 in such manner that as rod 68 moves to the right or left as viewed in Fig. 12, spiral nut 11b will be moved forward or back over spiral thread 12b. Rod 68 is carried by the carriage assembly, the operation of which will be hereinafter described in detail. It suffices at this point to say that the setting of the angle bar 34a determines the extent of the forward and back movement of rod 68. Parallel supporting rods 69 and 70 (Figs. 9, 11, and 12), fastened at their respective ends to frame 62, carry brackets 31a and 32a (Fig. 11) on which is mounted angle bar 34a. Both of these brackets are slidable endwise on parallel rods 69 and 70. Pointers 71 and 72 (Figs. 20, 22, and 23) are mounted on the brackets and indicate on graduated scale 73 (Fig. 12) the setting of the brackets. These brackets may be provided with any suitable locking means for holding them firmly in place at the desired points. Thumb screws 74 and 75 (Figs. 20 and 22) are shown to diagrammatically indicate in conventional manner one of the many common forms of locking means that may be employed. Bracket 31a (Fig. 22) acts as a fixed pivot member for angle bar 34a. Bracket 32a (Fig. 20), on the other hand, carries a movable pivot for angle bar 34a. It is thus to be seen that the angle bar 34a may have its movable pivot end swung forward or back as desired, so that operating the typewriter carriage in an endwise direction will cause spiral nut 11b to move over spiral thread 12b, thus producing a variation from the standard letter spacing when typing, as has hereinbefore been set forth.

The typewriter carriage 4 has connected thereto, by means of brackets 28b (Figs. 9 and 13) at the opposite ends thereof, an auxiliary carriage mounted on auxiliary carriage rail 76, and supported by rods 77 and 78. Rod 77 is fastened to the auxiliary carriage and acts not only to stiffen it, but also as a stabilizing member through its contact with rollers 125 and 126 which are indirectly attached to the frame of the justifying mechanism. Rod 78, on the other hand, is fastened to the frame of the justifying mechanism and acts to support and anchor the outer end of the auxiliary carriage by means of roller 127 and hooked arm 128. The auxiliary carriage is provided with an end plate 70 at each end thereof. Rods 77, 80, and 81 join the two end plates 79 to form a relatively rigid auxiliary carriage. The outer or rear end of each of the side plates 79 is provided with a downwardly offset portion (Fig. 13), which has cut therein an elongated horizontal slot 82. Rod 68 is provided with shoe-like portions at each end of such a size that they will slidably fit slots 82 in end plates 79 of the auxiliary carriage without rotation as is shown in Fig. 13. Rod 68 is provided with a depending arm 83 (see also Fig. 10) rigidly fastened thereto in such manner that it hangs substantially perpendicular to the center line of slot 82. Rod 68 is provided near its ends with bearing surfaces in engagement with a relatively rigid U shaped member 84 (Figs. 10 and 13), that is connected to rod 81 by means of parallel link members 85 and 86. Depending arm 83 may be moved forward and back as shown, while rod 68 takes parallel positions during such movement. Attached to the lower end of depending arm 83 is a plate 48a on which are mounted rollers 49, 50, and 51, which contact with the edges of the angle bar 34a, as is shown in Figs. 13 and 15. Thus when the angle bar 34a is moved forward or back at the movable pivot end, and fastened in place, then as the typewriter carriage is moved forward or back, plate 48a with its rollers 49, 50, and 51 attached to the depending arm 83 will move rod 68 forward or back in unison with plate 48a as it moves with the carriage. Rod 68 is in contact with rollers 66 and 67 (Fig. 12), which in turn are fastened to spiral nut 11b in such manner that as rod 68 moves forward or back spiral nut 11b will move forward or back over spiral thread 12b, and thus cause a variation in spacing between typed characters, as has been hereinbefore described.

The whole mechanism may be operated by means of the conventional typewriter driving spring 87 (Fig. 9) which, if desired, may be made of heavier construction than normal. However, I normally prefer to use a separate means of power for the justifying machine when same is in the form of an attachable unit. Such means may be an electric motor or the like, although a coil spring 88, similar to the spring 87 in the typewriter, may be used with satisfactory results.

The machine may be constructed so that it can be adjusted by the rotation of knob 39a (Fig. 24) to vary the number of characters in a given length of time to be typed, regardless of where the carriage is setting at the time the variation is made. When the carriage is set at the point of beginning the typing of a line, pivot 52 of roller 49 on plate 48a (Figs. 15 and 22) will be directly above fixed pivot 35 of bracket 31a (Fig. 11). Referring to Fig. 10, when the carriage is moved to its starting position, U shaped member 84 with differential transfer rod 68 will be carried to the left and thus carry pivot 52 to the left until it is directly above fixed pivot 35 at the top of bracket 31a. As has been hereinbefore pointed out, when pivot 52 is above fixed pivot 35, angle bar 34a may be swung forward or back at its opposite end without moving spiral nut 11b over spiral thread 12b, and hence, there will be no movement of the typewriter carriage. In order to take advantage of this feature, I prefer to provide a means for locking the angle bar in place so that it can not be moved except when pivot 52 is approximately over fixed pivot 35. This is accomplished in the following manner: Referring to Figs. 20 and 22, rod 89, which is provided with a longitudinal slot 90 and flat side 91, is held in the position shown by means of locking arm 92, which has on its lower end a projection 93 slidably fitting slot 90 in rod 89. Plate 48a has a projecting edge or cam surface 94 (Fig. 15) which is adapted, when the carriage is returned to its starting position, to contact roller 95, Fig. 22, and force same to the right, thus turning locking arm 92 about its pivot 96 which will withdraw projection 93 from slot 90 in rod 89. Rod 89 is then rotatable (Fig. 20), so that the flat side may be turned upward, thus allowing the angle bar lock 97 to lower out of engagement with rack 44 on bar 45 which carries movable pivot 55 of the angle bar 34a.

The operation of setting the angle bar to attain a predetermined compensation is accomplished as follows: The carriage is returned to the starting point of the line, in which position projecting edge 94 of plate 48a will contact with roller 95, thus revolving locking arm 92 about its pivot 96 to withdraw projection 93 from slot 90 in rod 89. The machine is now in condition for setting the angle bar which is accomplished in the following manner: Lever 98 (Fig. 9) is depressed to cause endwise movement of rod 99 connected to arm 100 (Fig. 18) on jack shaft 101, the outer end of which carries arm 102 which has rod 103 pivotally attached to its outer end. The opposite end of rod 103 (Fig. 9) is attached to arm 104 on the end of rod 89. With lever 98 depressed, rod 89 (Fig. 20) will be rotated so that its flat side will be up, and angle bar lock 97 lowered out of engagement with rack 44. With the mechanism in this condition, knob 39a (Fig. 24) may be rotated so that pointer 42a will point to the desired number on graduated dial 40a that agrees with the predetermined number of letters to be added or subtracted in justifying a line of typed matter or the like. After setting the graduated dial 40a, pressure is released on lever 98 which will cause rod 89 to rotate to the position shown in Fig. 20, thus locking bar 45 carrying movable angle bar pivot 55 from further movement.

With the carriage set at the starting position of a line, and lever 98 (Fig. 24) depressed, the operation of the mechanism which swings the angle bar forward or back to accomplish the desired variation in the number of letters in a given length of line, is as follows: Knob 39a is turned so that pointer 42a indicates the desired number of characters to be added or subtracted. Attached on the same shaft as knob 39a is a gear 105 in mesh with rack member 106. The endwise movement of this rack member causes the rotation of gear 107 (Fig. 18), mounted on jack shaft 108, which has on its opposite end another gear 109 in mesh with rack 110, which in turn, meshes with gear 111 (Fig. 9) mounted on the end of shaft 38. Shaft 38 is parallel to shafts 69, 70, and 89 (Fig. 11), and passes through brackets 31a and 32a (Figs. 20 and 22). Shaft 38 is keywayed substantially throughout its length, and has a gear 43 (Fig. 20) slidably keyed thereto and mounted in bracket 32a. This gear 43 is in mesh with rack 44 on bar 45, which carries movable pivot 55 of the angle bar 34a. This allows the rotation of graduated dial 40a to be transmitted to the angle bar 34a to set it at the desired inclination to produce the required compensation in justifying typed matter or anything else that is to be justified by this procedure.

The operation of angle bar lock 97 (Fig. 20) has been discussed in detail and shown as operating to lock the angle bar in place by engaging with the teeth in rack 44. This is a simple and convenient procedure for accomplishing the desired end, as well as reducing to a minimum loose play in the mechanism once the angle bar has been set at the desired point for compensation purposes. It is a very simple matter to use gearing and a spiral mechanism, such that moving the rack 44 one tooth past angle bar lock 97 will vary the number of characters in a given length of space to be typed by one. This is not the only manner, however, in which this end may be accomplished as has been shown, for instance, in Fig. 3 where a notched graduated dial 40 is used. Referring again to the mechanism shown in Fig. 20, if it is desired to use gearing such that the spacing from tooth to tooth of rack 44 is not the same as is required to move angle bar 34a just enough to add or subtract one character from the line to be typed, then the desired end may be attained by cutting an auxiliary rack 141 (Figs. 29 and 30), or the equivalent having the desired pitch, on the side of bar 45a, so that angle bar lock 97a will engage therewith when in locked position. It is to be understood that these are only a few of the many equivalent ways in which the desired calibrated locking may be obtained.

In Fig. 2 has been shown a combination of the improved mechanism wherein the conventional rack and escapement within the typewriter is utilized. However, in some instances, it is desirable to provide a rack and escapement mechanism which is entirely independent of the rack and escapement within the typewriter or other machine which is to have compensation features added. In Figs. 9 to 30 inclusive, there is shown an assembly of my improved mechanism wherein the unit to which the typewriter or the like is to be attached, contains its own escapement and rack mechanism. When using this auxiliary rack and escapement, the rack in the machine is either removed or else thrown out of engagement. Constructing the mechanism as a separate attachable unit has many advantages, in that it can be transferred from typewriter to typewriter, even to different makes or models of typewriters, and hence does not have to be thrown away when the typewriter it is attached to wears out, as is normally the case with inbuilt mechanisms of the prior art. The escapement mechanism in the several makes of typewriters is operated in various ways. The levers in some machines which actuate the escapement do so by means of a push motion, others by a pull motion, and still others by a vertical motion. In Fig. 12 has been shown in diagrammatic manner, a conventional form of escapement mechanism, many equivalent types of which are in existence and well known to the art. For descriptive purposes, it suffices to say that the back and forth movement of the upper end of escapement lever 112 operates to give the intermittent motion to escapement wheel 2c which permits the carriage to move the predetermined distance per character. As a means of increasing the rigidity of escapement wheel 2c, I prefer to use a sleeve-like member 129 that closely fits the shaft on which the escapement wheel 2c is mounted, and which has a large base in contact with the side of the escapement wheel, the whole being tightly held together by means of screw 130, or the like. Escapement lever 112 is provided with an adjustable connection 113 at its lower end in contact with pivoted escapement actuator plate 114. It is thus obvious that the mechanism that operates the form of escapement shown must act to give the pivoted escapement actuator plate 114 a back and forth motion at its upper end. If the particular typewriter or the like which is attached to the improved justifying mechanism, operates on the escapement in the typewriter by means of a pull motion, then the same pull rod 115 may be extended and connected to the pivoted escapement actuator plate 114 as is shown in Fig. 17. On the other hand, if the escapement on the typewriter is operated by a push mechanism, this may be transmitted as a pull motion to the pivoted escapement actuator plate 114 by means of a suitable connection to the lower end of oppositely disposed double armed member 116 mounted on adjustably pivoted jack shaft 117. In some cases, the typewriter escapement is operated by a vertical downward motion. This may likewise be transmitted to a pull motion by connecting the vertical motion rod 118 (Fig. 25) to an arm 119 mounted in a forwardly extending direction on jack shaft 117. Other directions of motion may be transmitted to the pivoted escapement actuator plate 114 in equivalent manner.

Typewriters are provided with a lever wherein the rack may be disengaged from the rack pinion so that the carriage may be freely moved back and forth at the pleasure of the operator. Where, however, the conventional rack is disengaged or removed from the typewriter which is attached to the improved differential or compensation mechanism, some other means must be provided if the operator is to be able to release the carriage for free endwise motion. One form of apparatus adapted for the accomplishment of this end is shown in Figs. 9, 13, and 14. Typewriter carriage release lever 120 is connected through link 121 to a pivoted bell-crank member 122. The projecting arm of the bell-crank member 122 is in contact with the upper face of one end of the member 123 pivoted near its mid-point and in contact at its opposite end with the underface of pivoted member 124, which carries rack 3b. When typewriter carriage release lever 120 is depressed, link 121 rotates bell-crank member 122 so as to turn pivoted member 123 to its dotted position as shown in Fig. 13. This in turn raises the pivoted rack-carrying member 124 to its dotted position, which disengages rack 3b from rack bar pinion 14b, thus releasing the typewriter carriage so that it may be moved back and forth at the will of the operator.

The operation of the mechanism shown in Figs. 9 to 30 inclusive is as follows: The brackets 31a and 32a are set to correspond with the desired margins for the sheet of material to be typed. The carriage of the typewriter is moved to its starting position which releases the locking mechanism used in connection with the movable pivot 55 in bracket 32a. Lever 98 is depressed and knob 39a rotated until pointer 42a indicates on the graduated dial 40a the number of letters that the particular line to be typed is to be compensated. Lever 98 is then released to lock the angle bar in fixed position which will automatically determine the exact spacing between characters in the line so that the number to be typed in the line will exactly fill the allotted space between the typewriter stops, which are preferably set in synchronism with the setting of brackets 31a and 32a to facilitate starting and stopping at the proper points determined by the setting of the brackets, though such typewriter stops are not essential to the operation of the machine. The angle bar 34a being held in position, rollers 49, 50, and 51 in contact with the sides thereof will carry the differential transfer rod 68 forward or back, as the case may be, depending upon the setting of the angle bar 34a from its zero position, it being recognized that for a zero setting of the angle bar, rod 68 will not move either forward or back. The movement of differential transfer rod 68, which is in contact with rollers 66 and 67, will move spiral nut 11b over the surface of spiral thread 12b to produce compensated motion between escapement wheel 2c and rack bar pinion 14b in manner to exactly allot the desired space for each character to be typed in the line being compensated. This procedure is repeated each time a line is typed so that every line is the same length, although the number of characters per line will vary.

For convenience the present invention has been described in terms of its application to a typewriter wherein the escapement mechanism operates in intermittent manner. It is to be noted, however, that the invention is not limited to use on typewriters, but rather is adaptable, in general, to machines wherein relative movement is desired, and such relative movement may be continuous instead of intermittent. This continuous or intermittent relative movement may be uniform, as is normally desired when compensating typed matter to uniform length on a typewriter or the like, or it may be non-uniform if the particular thing to be calibrated, so requires. In the latter case, it is only necessary to use an angle bar and follower such that the desired or prescribed non-uniform calibration is attained.

Other modes of applying the principle of my invention may be employed instead of those explained, change being made as regards the means and steps herein disclosed, provided those stated by any of the following claims or their equivalent be employed.

I therefore particularly point out and distinctly claim as my invention:

1. In a controlled differential mechanism the combination of a spiral nut and spiral gear meshing therewith, a tubular member joined to said spiral nut, a disc-like member connected to said tubular member, shaft means within said tubular member and carrying said spiral gear thereon, and means operatively connected to said disc-like member for causing endwise movement of said spiral nut over said spiral gear.

2. In a controlled differential mechanism the combination of a spiral nut and spiral gear meshing therewith, a tubular member joined to said spiral nut, a disc-like member connected to said tubular member, shaft means within said tubular member and carrying said spiral gear thereon, means in contact with the opposite faces of said disc-like member, and angle bar means for moving said spiral nut over said spiral gear through the agency of said disc-like member and means in contact therewith.

3. A controlled differential mechanism which includes a split pinion, concentric shafts on which the parts of said split pinion are mounted, a spiral nut and spiral gear mounted on said concentric shafts and in mesh with each other, and means to cause said spiral nut to move on the spiral gear in controlled manner, whereby the parts of said split pinion may be rotatively moved in controlled manner relative to each other in both directions.

4. In a differential means for calibrating or dividing a given space into a predetermined number of controlled size smaller spaces, the combination which includes a supporting means, two supports separately mounted thereon and separately movable lengthwise thereof, an angle bar, a fixed pivot on one of said supports for joining said angle bar thereto, and a movable pivot on said second support for joining the angle bar thereto.

5. In a differential means for calibrating or dividing a given space into a predetermined number of controlled size smaller spaces, the combination which includes a supporting means, two supports separately mounted thereon and separately movable lengthwise thereof, an angle bar, a fixed pivot on one of said supports for joining said angle bar thereto, a movable pivot on said second support for joining the angle bar thereto, and means including a follower in contact with the controlling edge of the angle bar whereby the setting of the angle bar controls the motion transmitted through the differential means.

6. In a differential means for calibrating or dividing a given space into a predetermined number of controlled size smaller spaces, the combination which includes a supporting means which may have a graduated scale inscribed thereon, two supports separately mounted thereon and separately movable lengthwise thereof, an angle bar, a fixed pivot on one of said supports for joining said angle bar thereto, a movable pivot on said second support for joining the angle bar thereto, and means whereby the center line of the fixed and movable pivots is always parallel to the controlling edge of the angle bar for all settings thereof.

7. In a line justifying device for typewriters and the like which may have at least one graduated scale, the combination which includes margin stops, a means having attached thereto and movable lengthwise thereof two angle bar supports, an angle bar, a fixed pivot on one of said supports for joining said angle bar thereto, a movable pivot on said second support for joining the angle bar thereto, and means whereby the pivots may be synchronized with the margin stops.

8. In a line justifying device for typewriters and the like which may have at least one graduated scale, the combination which includes margin stops, a means having attached thereto and movable lengthwise thereof two angle bar supports, an angle bar, a fixed pivot on one of said supports for joining said angle bar thereto, a movable pivot on said second support for joining the angle bar thereto at a point which may vary from the remote end of the angle bar to a point intermediate of the fixed pivot and the remote end of the angle bar, the margin stops being adapted to be synchronized with and to act in conjunction with the pivots on said supports to define the length of line to be justified, means whereby the center line between said fixed and movable pivots is always parallel to the controlling edge of the angle bar for all settings thereof, and graduated means for operating the mechanism which moves the movable pivot crosswise of the supporting means.

9. In a line justifying device for typewriters and the like which may in some instances have one or more graduated scales, the combination which includes means with margin stops, a means having attached thereto and movable lengthwise thereof two angle bar supports, an angle bar, a fixed pivot on one of said supports for joining one end of said angle bar thereto, a movable pivot on said second support for joining the angle bar thereto at a point which may vary from the remote end of the angle bar to a point intermediate of the fixed pivot and the remote end of the angle bar, the margin stops being adapted to be synchronized with and to act in conjunction with the pivots on said angle bar supports to define the length line to be justified, means whereby the center line between said fixed and movable pivots is always parallel to the controlling edge of the angle bar for all settings thereof, means for moving the movable pivot crosswise of the means carrying the angle bar supports, including a gear and rack operated by a graduated means, and means including a follower roller whose center follows the center line between the fixed and movable pivots in contact with the controlling edge of said angle bar, whereby the setting of the angle bar controls the motion transmitted through the machine to accomplish the justification desired.

10. In a differential means for calibrating or dividing a given space into a predetermined number of controlled size smaller spaces, the combination which includes an angle bar, an angle bar locking means, and locking means for locking the angle bar locking means in position so as to prevent adjustment of the angle bar except when the differential means is set approximately in starting position for dividing a given space.

11. In a differential means for calibrating or dividing a given space into a predetermined number of controlled size smaller spaces, the combination which includes an angle bar, and two locking means in series for said angle bar, one of said locking means being locked at all times except when the differential means is set approximately at the starting position for dividing a given space into a predetermined number of controlled size smaller spaces, in which position it is automatically unlocked so that the second locking means may be operated for releasing the angle bar to permit its adjustment to a desired setting.

12. In a differential means for calibrating or dividing a given space into a predetermined number of controlled size smaller spaces, the combination which includes a supporting means, two supports mounted thereon and movable lengthwise thereof, an angle bar, a fixed pivot on one of said supports for joining said angle bar thereto, a movable pivot on said second support for joining the angle bar thereto, means for locking the angle bar in fixed position, and means for unlocking the angle bar only when the carriage is approximately at its starting position.

13. In a differential means for calibrating or dividing a given space into a predetermined number of controlled size smaller spaces, the combination which includes a supporting means, two supports mounted thereon and movable lengthwise thereof, an angle bar, a fixed pivot on one of said supports for joining said angle bar thereto, a movable pivot on said second support for joining the angle bar thereto, means for locking the angle bar in fixed position, means for unlocking the angle bar only when the carriage is approximately at its starting position, and means for adjusting the setting of the angle bar when same is unlocked.

14. In a differential means for calibrating or dividing a given space into a predetermined number of controlled size smaller spaces, the combination which includes a supporting means, two supports mounted thereon and movable lengthwise thereof, an angle bar, a fixed pivot on one of said supports for joining said angle bar thereto, a movable pivot on said second support for joining the angle bar thereto, and two locking means in series for said angle bar, one of said locking means being locked at all times except when the differential means is set approximately at the starting position for dividing a given space into a predetermined number of controlled size smaller spaces, in which position it is automatically unlocked so that the second locking means may be operated for releasing the angle bar to permit its adjustment to a desired setting.

15. In a differential means for calibrating or dividing a given space into a predetermined number of controlled size smaller spaces, the combination which includes a supporting means, two supports mounted thereon and movable lengthwise thereof, an angle bar, a fixed pivot on one of said supports for joining the angle bar thereto, two locking means in series for said angle bar, one of said locking means being locked at all times except when the differential means is set approximately at the starting position for dividing a given space into a predetermined number of controlled size smaller spaces, in which position it is automatically unlocked so that the second locking means may be operated for releasing the angle bar to permit its adjustment to a desired setting, and means for unlocking said second locking device.

16. In a differential means for calibrating or dividing a given space into a predetermined number of controlled size smaller spaces, the combination which includes a single supporting means, two separate supports mounted thereon and separately movable lengthwise of said common supporting means, an angle bar, a fixed pivot on one of said supports for joining said angle bar thereto, a movable pivot on said second support for joining said angle bar thereto, and a means operatively connected to said angle bar for moving it forward and back at the movable pivot end to obtain the desired size space per movement of the escapement mechanism, which space may be expanded, condensed, or the same as normal spacing.

17. In a differential means for calibrating or dividing a given space into a predetermined number of controlled size smaller spaces, the combination which includes an angle bar usable for controlling the size of the smaller spaces, a fixed pivot and a movable pivot for said angle bar, a support mechanism for said pivots which permits individual relocation of same along a prescribed line, a graduated means indicating variations in the number of smaller spaces that a given space is to be divided into, and means for operatively joining said graduated means to said angle bar, said means including a jack shaft with suitable connections to said graduated means and to said angle bar.

18. In a mechanism which has as a part thereof a differential means for calibrating or dividing a given space into a predetermined number of controlled size smaller spaces, the combination which includes an angle bar usable for controlling the size of the smaller spaces, a fixed pivot and a movable pivot for said angle bar, a support mechanism for said pivots which permits individual relocation of same along a prescribed line, a graduated means indicating variations in the number of smaller spaces that a given space is to be divided into, means for operatively joining said graduated means to said angle bar, said means including a jack shaft with suitable connections to said graduated means and to said angle bar, and a supporting means for said graduated means, one end of said supporting means being mounted on the frame of said differential means.

19. In a mechanism for calibrating or dividing a given space into a predetermined number of controlled size smaller spaces, the combination which includes a swingable bar, means at the ends of said bar for supporting same, means for causing said swingable bar to assume parallel positions as it swings forward and back, and means connected to said swingable bar and in contact with an angle bar, whereby the setting of the angle bar will determine the amount of forward and back movement of said swingable bar.

20. In a mechanism for calibrating or dividing a given space into a predetermined number of controlled size smaller spaces, the combination which includes an angle bar mounted on a fixed pivot and a movable pivot, said angle bar remaining substantially motionless during the division of a given space into a predetermined number of controlled size smaller spaces, a movable means in contact with said angle bar and adapted to follow same during space dividing movement, a swingable bar on which said angle bar following means is attached, means at each end of said swingable bar which prevent it from rotating, and yet permit it to move forward or back, means for causing said swingable bar to maintain parallel positions in its forward and back movement, and means in contact with said swingable bar adapted to transmit its forward and back motion to a suitable means for varying in predetermined manner the number of controlled size smaller spaces that a given space is being divided into.

21. In a differential control mechanism, the combination of an angle bar, a fixed pivot and a movable pivot for said angle bar, a follower means for said angle bar, the controlling pivotal point of said follower means being so located that when the follower means is moved back and forth along said angle bar, the pivotal point of said follower means will follow a line joining the centers of the pivots of said angle bar, and means permitting the pivotal point of said follower means to pass from a point on the axis of one of the angle bar pivots to a like point on the axis of the other pivot for said angle bar.

22. A line justifying device for typewriters and the like, which comprises two concentric shafts, an escapement wheel mounted on one of said shafts, a rack pinion mounted on the other, a sleeve joined to one of said shafts for rotation therewith as well as endwise movement thereon, a spiral means joining said concentric shafts through said sleeve in manner permitting rotative movement of one of said shafts relative to the other, an angle bar, a fixed pivot and a movable pivot for said angle bar, a follower means for said angle bar, the controlling pivotal point of said follower means being so located that when the follower means is moved back and forth along said angle bar, the pivotal point of said follower means will follow a line joining the centers of the pivots of said angle bar, means permitting the pivotal point of said follower means to pass from a point on the axis of one of the angle bar pivots to a like point on the axis of the other pivot for said angle bar, and means for joining said follower means to said spiral means in manner such that when said follower means is moved back and forth along the said angle bar, the setting of the angle bar will determine the amount of relative movement of said concentric shafts to each other.

23. A line justifying device for typewriters and the like, which comprises two concentric shafts, an escapement wheel mounted on one of said shafts, a rack pinion mounted on the other, a sleeve joined to one of said shafts for rotation therewith as well as endwise movement thereon, a spiral nut on said sleeve mounted on one of said concentric shafts and a spiral gear on the other of said concentric shafts, said spiral nut meshing with said spiral gear in manner such that endwise movement of the spiral nut on the spiral gear will cause rotation of said concentric shafts relative to each other, an angle bar, a fixed pivot and a movable pivot for said angle bar, said pivots being so located that a line joining their centers will be parallel to the controlling edge of said angle bar, a roller follower means for said angle bar, the axis of said roller follower being so located that when the roller follower means is moved back and forth along said angle bar, the axis of said roller follower will follow a line joining the centers of the pivots of said angle bar, said roller follower being adapted to be placed with its axis directly in line with the axis of the fixed pivot of said angle bar at the start of justification, and as the justification proceeds to the end of the line being justified, the axis of the roller follower will be carried forward to a point where it is in line with the axis of said movable pivot, and means for joining said roller follower means to the spiral nut in manner such that when said roller follower means is moved back and forth along said angle bar, the setting of the angle bar will determine the amount of relative movement of said concentric shafts to each other.

24. A line justifying device for typewriters having an escapement wheel and a carriage provided with a rack, a controlled differential comprising a spiral nut and spiral gear operatively connected between said escapement wheel and rack, an angle bar connected to the carriage for movement in unison therewith, supports for said angle bar, said supports being separately connected to a mounting on the carriage and separately movable to correspond with the length of line to be typed, a stationary pivot for said angle bar on one of said supports, an endwise movable member on said other support movable in a direction crosswise of said angle bar, a pivot on said endwise movable member, means connecting same to the angle bar and movable lengthwise of the latter, means to move said endwise movable member in an endwise direction to cause said angle bar to pivot around said stationary pivot, and means operatively connecting said angle bar and said spiral nut in manner causing said spiral nut to move relative to said spiral gear when said angle bar is set at an angle other than at right angles to the axis of said spiral gear, and the carriage is moved endwise.

25. A line justifying device for typewriters having an escapement wheel and a carriage provided with a rack, a controlled differential comprising a spiral nut and spiral gear operatively connected between said escapement wheel and rack, an angle bar connected to the carriage for movement in unison therewith, supports for said angle bar, said supports being connected to a mounting on the carriage and movable to correspond with the length of line to be typed, a stationary pivot for said angle bar on one of said supports, means for connecting said pivot to said angle bar, an endwise movable member on said other support movable in a direction crosswise of said angle bar, a pivot on said endwise movable member, means connecting same to the angle bar and movable lengthwise of the latter, said pivots being joined to said angle bar in such manner that the centers of both pivots are at all settings of the angle bar, on the same side and the same distance from the controlling edge thereof, follower means in contact with said angle bar and so pivoted that its pivotal center follows the line joining the centers of said angle bar pivots and coincides with the axis of said angle bar pivots at each end of travel for the line being justified, graduated means to move said endwise movable member in an endwise direction to cause said angle bar to pivot around said stationary pivot, and means operatively connected between said angle and said spiral nut to cause said spiral nut to move relative to said spiral gear when said angle bar is set at an angle other than at right angles to the axis of said spiral gear, and the carriage moved endwise.

26. In a differential means for calibrating or dividing a given space into a predetermined number of controlled size smaller spaces, the combination which includes a supporting means which may have a graduated scale inscribed thereon, two supports separately mounted thereon and separately movable lengthwise thereof, an angle bar, a fixed pivot mounted on one of said supports for joining said angle bar thereto, a movable pivot mounted on said second support for joining the angle bar thereto at a point which may vary from the remote end of the angle bar to a point intermediate of the fixed pivot and the remote end of the angle bar, means whereby the center line between said fixed and movable pivots is always parallel to the controlling edge of the angle bar for all settings thereof, means mounted in connection with said second support whereby the movable pivot may be moved in controlled manner crosswise of the supporting means, and graduated means operatively connected to the means for moving the movable pivot crosswise of the supporting means, whereby the movement of the graduated means one graduation will change the number of smaller spaces that the given space is being divided into, by one, regardless of the length of space being divided so long as it is within the limits of the machine's operation.

27. In a line justifying device for a machine of the character described, the combination which comprises a movable carriage, a single rack connected to said carriage for operating same, a rack pinion adapted to mesh with said rack, an escapement wheel, said escapement wheel and rack pinion being mounted adjacent each other on concentric shafts one solely within the other and adapted for movement relative to each other, a controlled differential mechanism connecting said concentric shafts, and an adjustable means for controlling said differential to permit predetermined varying ratios of rotation of said rack pinion to said escapement wheel, each ratio giving a constant amount of movement per actuation of the escapement wheel throughout the length of the line being justified.

28. In a controlled differential mechanism for typewriters having a carriage and a carriage-carried rack bar, rotary means driven thereby and also having a carriage escapement wheel connected with the rotary means so that upon release of said escapement wheel the rotary means may function, the combination which includes an angle bar connected for movement with said carriage, a fixed pivot at one end of said angle bar, means for joining said fixed pivot to said angle bar, an arm mounted on said angle bar between the remote end thereof and said means for joining the fixed pivot thereto, said arm being adapted to non-rotatably slide lengthwise of said angle bar, a movable pivot for said angle bar, said movable pivot being mounted on said arm, said means for joining said pivots to said angle bar being adapted to do this in manner such that the centers of both pivots are at all settings of the angle bar, on the same side and the same distance from the controlling edge thereof, supporting means for said pivots, follower means in contact with the controlling edge of said angle bar and so mounted that its controlling point follows the line joining the centers of said angle bar pivots, and means under control of the follower means for controlling the connection between the rotary means and the escapement wheel to effect relative rotation of the two.

29. In a controlled differential mechanism for typewriters having a carriage and a carriage-carried rack bar, rotary means driven thereby and also having a carriage escapement wheel connected with the rotary means so that upon release of said escapement wheel the rotary means may function, the combination which includes a non-translatable angle bar, means for joining the angle bar to the typewriter frame, a fixed pivot at one end of said angle bar, means for joining said fixed pivot to said angle bar, an arm mounted on said angle bar between the remote end thereof and said means for joining the fixed pivot thereto, said arm being adapted to non-rotatably slide lengthwise of said angle bar, a movable pivot for said angle bar, said movable pivot being mounted on said arm, said means for joining said pivots to said angle bar being adapted to do this in manner such that the centers of both pivots are at all settings of the angle bar, on the same side and the same distance from the controlling edge thereof, supporting means for said pivots, a swingable bar, means for supporting said swingable bar, means connecting said swingable bar supporting means to the typewriter carriage for movement therewith, means for preventing said swingable bar from rotating, a follower means in contact with the controlling edge of said angle bar and so mounted on the swingable bar that its controlling point follows the line joining the centers of said angle bar pivots, and means under control of the follower means for controlling the connection between the rotary means and the escapement wheel to effect relative rotation of the two.

30. In a line justifying device for typewriters, the combination of a rack pinion and an escapement wheel, a rack in said typewriter, means for urging said rack in one direction, said rack being in mesh with said rack pinion, said pinion and escapement wheel being mounted adjacent to each other at the same end of a pair of concentric shafts adapted for controlled relative rotation, means for joining said escapement wheel and rack pinion through said concentric shafts in manner permitting controlled but variable ratios of movement of one relative to the other, each ratio determining a constant spacing for all letter spaces throughout the line, and means controlled by the typewriter keys for controlling the escapement of said escapement wheel.

31. A line justifying device which includes a typing mechanism, a typewriter rack, a typewriter escapement wheel, typewriter escapement wheel pinion pawls, a pair of pinions mounted adjacent to each other on concentric shafts, one acting as a pinion for said rack and the other as a ratchet pinion for the escapement wheel pawls, and means joining the two pinions for controlling rotative movement of the pinions relative to each other.

HARWOOD KENNETH RIDER.